United States Patent Office 3,106,491
Patented Oct. 8, 1963

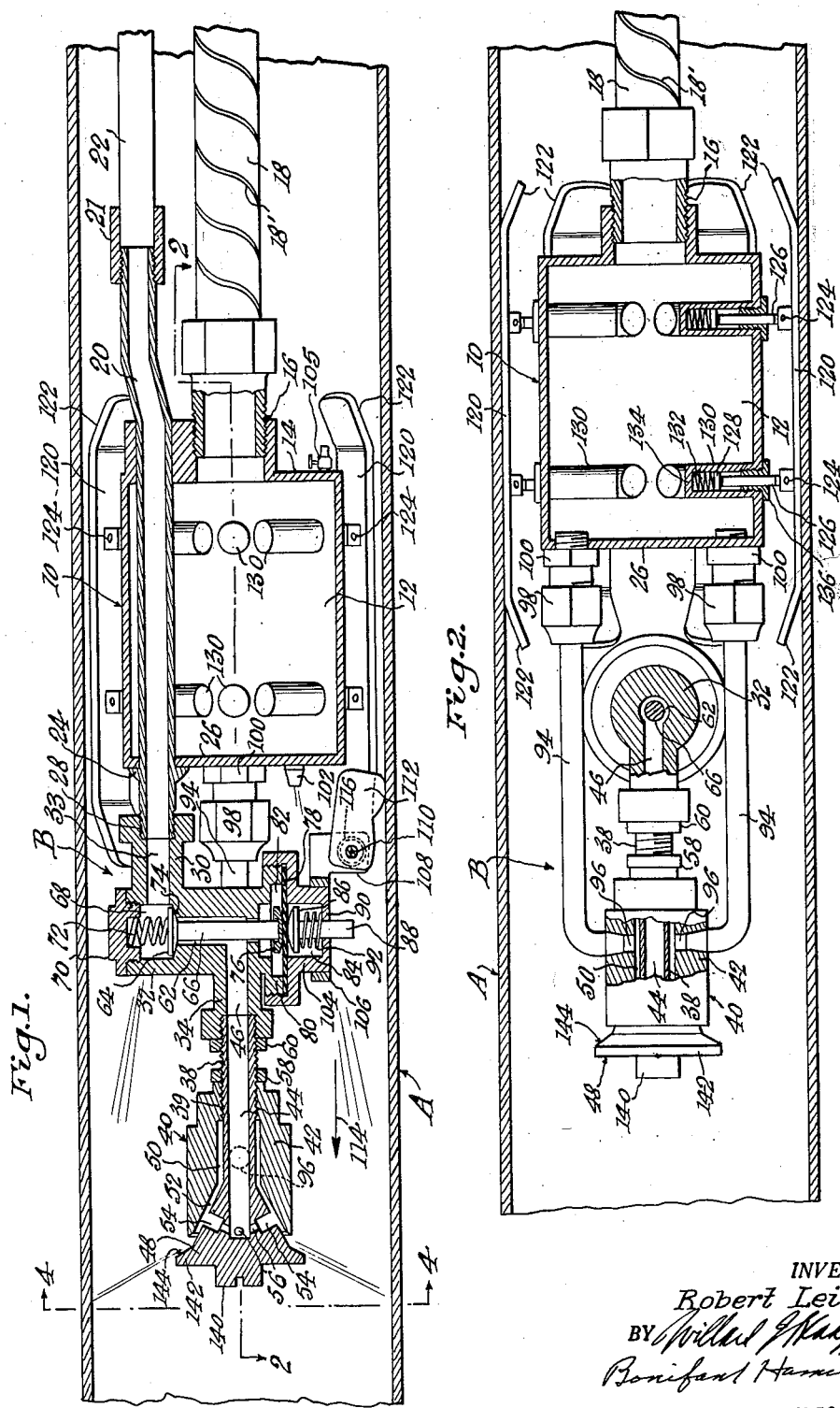

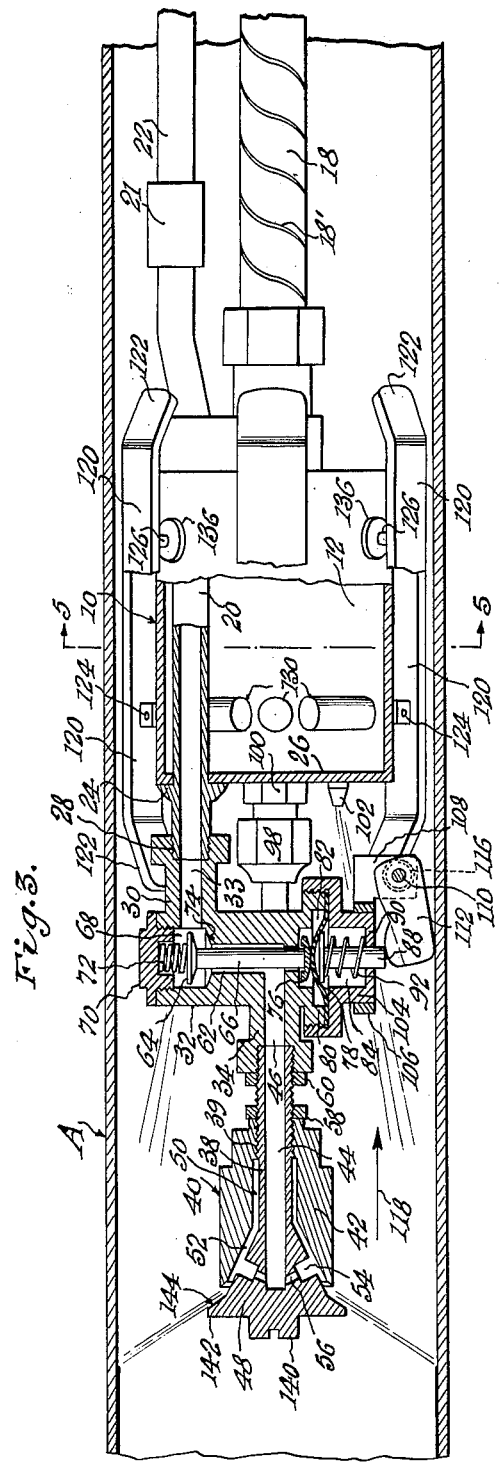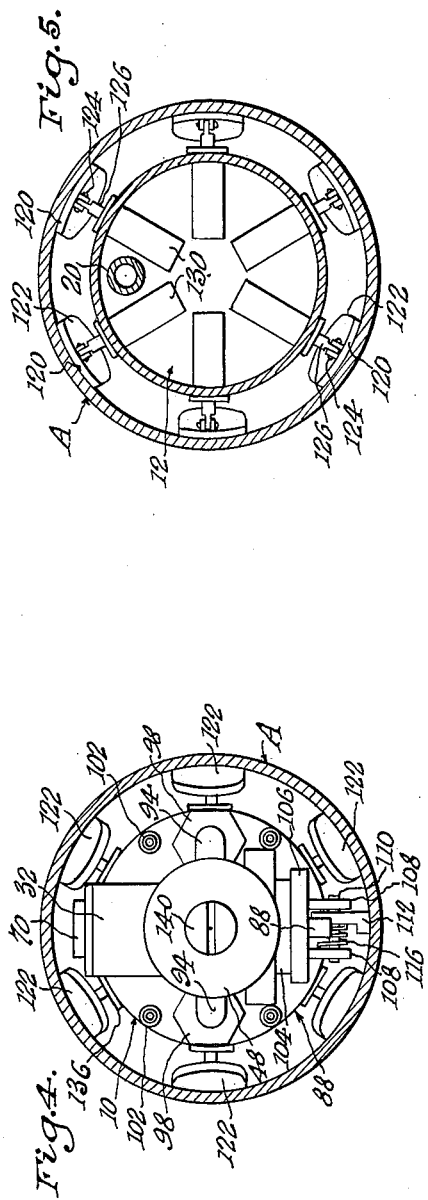

3,106,491
PIPE CLEANING AND COATING APPARATUS
Robert Leibner, 47 Ave. B, Kings Park, N.Y.
Filed June 24, 1960, Ser. No. 38,680
8 Claims. (Cl. 118—2)
(Granted under Title 35, U.S. Code (1952), sec. 266)

The invention described herein may be manufactured and used by or for the Government for governmental purposes without the payment of any royalty thereon.

The scale deposition of mineral salts on inner surfaces of hard water-carrying conduits frequently presents severe problems, particularly in installations involving heat interchange between the water and the conduits carrying such water, wherein the water is subjected to heated environments such as in boilers, stills, hot-water pipelines and the like. Such mineral salts present in the water are likely to become deposited as hard coatings on the interior of the conduits, requiring frequent removal operations for maintenance of such conduits in relatively open condition for free heat exchange therein, for maintenance of free circulation of water therethrough, and for many other reasons. The deposition of such insoluble salts directly through boiling the water in boilers, or through concentration beyond the limit of solubility of salts in solution, or again, by interaction between otherwise soluble salts, causes serious trouble in boiler practice, and lowers the efficiency of the boilers. Any incrustation of scale retards heat transmission to the water, thereby increasing fuel consumption; overheating of the plates or tubes may result in serious mechanical damage, and the removal of a hard scale by mechanical means leads to a likelihood of further damage, in addition to the cost of removal and to the cost and inconvenience from the boiler being idle for some time. If the deposit remains as a soft mud, frequent use of the blow-off cock is demanded and heat is lost in the hot water blown off; but this, of course, is preferable to the accumulation of the deposit, and its baking on the plates or tubes to a hard mass.

The question of corrosion also is closely associated in many cases with the production of deposits and treatment on scientific lines for the removal of the latter overcomes troubles from the former.

Natural waters vary widely in composition and some are wholly unsuited for boiler use, either by reason of the formation of deposits and scale, or of their corrosive nature. It is convenient to regard deposits as the soft material which can be removed as sludge; incrustations as deposits more or less firmly adherent to the boiler; and scale as the firm, hard material which can only be removed with difficulty, usually requiring removal thereof by mechanical chipping. However, it is obvious that no hard-and-fast line can be drawn between these forms.

Either form is to be associated primarily with the "hardness" of the water. "Temporary hardness," that is, hardness removable by simple boiling, is due to calcium and magnesium carbonates, and to a small extent also to ferrous carbonate.

"Permanent hardness" in water is due chiefly to the sulphates of calcium and magnesium, and to a minor extent to the chlorides and nitrates of these metals. Boiling at ordinary pressure does not cause the deposition of any of these salts, providing the water does not become too concentrated. On the other hand, when boiling the water at the higher pressures existing in boilers, almost complete precipitation of calcium sulphate occurs, and this constitutes the most troublesome constituent in boiler waters, it being very largely responsible for the formation of hard, adherent scales.

Waters which are, in the main, temporarily hard, will deposit the carbonates of calcium and magnesium (also ferrous carbonate, if present), either in the boiler or feed-water heaters, by the simple action of the bicarbonates. Such deposits usually are powdery, in the presence of organic matter, they seldom form coherent deposits, and so may be gotton rid of by the sludge cock. Under some conditions, however, the deposits bake on the plates or tubes and form incrustations. Further, in concentration of the water, other salts in solution, like magnesium or sodium sulphate, may react on the incrustation with the formation of calcium sulphate, and produce a much harder deposit—a true scale. Similarly, an incrustation containing magnesium hydroxide may react with magnesium chloride and form a hard incrustation.

The use of an anti-incrustation fluid in the boiler is greatly favored by many engineers, but is not such a satisfactory method of treatment as the prior removal of the scale-forming constituents. The method has the advantage of requiring no external plant and for one or two boilers this is an advantage; but for larger installations, a proper softening plant is better and more general in practice. It is obvious that precipitation of any solids by the boiler fluid takes place in the boiler, and the sludge so formed must be blown out at intervals. Some of the compounds used are not without action on boiler plates, tubes and fittings, especially, copper alloys.

The present invention relates to improvements in mechanical apparatus for removing and/or inhibiting formations of deposits in tubular water-carrying equipment of such a nature as has been indicated above. In order that such pipe may not deteriorate in its interior, it is necessary that the above-mentioned deposits from water passing through tubular heat exchangers be removed before they can harden into scale, and that formation of adherent, dense scale deposits be inhibited.

In order that pipe may not deteriorate in its interior, it is necessary that a suitable coating be applied thereto. This is particularly true of boiler tubes in which the coating compound or material usually has been placed on the internal surfaces of such boiler tubes and other pipes by means of a brush which operates from a turbine. The brush assembly requires one operator for controlling the operation of the turbine and another operator for supplying the application of the coating material to the brush. Further, because of the brushing action and the dual control, the coating applied has had a tendency to be uneven, which is undesirable.

The present invention has for one of its objects the provision of an improved apparatus for applying liquid protective coatings to internal surfaces of cylindrical tubes, pipes, casings, boiler tubes, or other such tubular shapes which require internal cleaning and coating with a protective coating composition.

A further object of the present invention is to provide an improved spray gun which is so constructed whereby it may be projected through a pipe, such as a boiler tube pipe, and which will spray an even coating of a protective liquid coating composition on the internal surfaces of such pipes.

A still further object of the present invention is to provide equipment which will clean a cylindrical-shaped tube, pipe, or casing of all loose scale, dust, and foreign matter while spraying liquid protective coating material uniformly to internal surfaces of such tubular elements, the cleaning and spraying being performed in what is essentially a single operation.

A still further object of the present invention is to provide an improved structure of a spray gun with simply constructed and efficient guide means which will enable progressive and retractive movements of the spray gun and associated parts throughout a section of an internally eccentrically-shaped pipe for facilitating deposited accretions therefrom, and thus enabling an efficient restoration of a true cylindrical internal configuration to such pipe.

Still further objects of the invention will become apparent as the description proceeds, and the features of novelty will be defined in particularity in the appended claims.

It is obvious that all boiler scale resulting from impurities in feed water should be removed completely from internal surfaces of boiler tubes. However, it is well known that some scale always remains in such water and is deposited on the interior of such tubes, thereby producing internal eccentricities in the tubes through which guide instrumentalities for cleaning equipment must be caused to travel. In practice, it is not required to replace such tubes that are deflected less than 1½ inches in a water tube boiler of the straight tube type. Those tubes that are deflected and are not replaced are internally eccentrically deformed and obstruct the passage of cleaning means provided with conventional cylindrical guide devices.

The accompanying drawings illustrate structural details of the improved pipe-cleaning apparatus of the present invention, in which drawings:

FIG. 1 is a longitudinal sectional elevation of the improved apparatus of the invention as it progresses forwardly through a tubular shape to be cleaned, such shape being, for example, a boiler tube, the arrow in the view indicatnig forward directional movement of the apparatus with respect to the tubular shape of element being cleaned;

FIG. 2 is a view partly in elevation and partly in section along the line 2—2 of FIG. 1, the view showing structural and operational details of improved guide means employed in connection with the improved apparatus for guiding the same through an interiorly deformed opening through the cylindrical shape in addition to structural details of cleaning instrumentalities;

FIG. 3 is a view similar to FIG. 1, but showing reversal of position of parts of the cleaning apparatus during retraction of the apparatus with reference to the tubular shape which has been cleaned, the view showing application of liquid coating medium to the interior surfaces of the tubular shape;

FIG. 4 represents a front end elevation of the apparatus, the view being taken along the line 4—4 of FIG. 1, looking in the direction of the arrows; and FIG. 5 is a transverse vertical section through the apparatus, the view being taken along the line 5—5 of FIG. 3, looking in the direction of the arrows.

Referring more particularly to the drawings, reference character A indicates a fragment of a tubular element to be cleaned and protectively coated, and which receives the improved cleaning apparatus B which latter embodies the improved structural features of the instant invention. The tubular element A may be, by way of illustrative example, a fragment of a boiler tube which interconnects with suitable boiler headers not shown, which are included in a boiler structure which also is not shown.

The tubular element A receives the cleaning instrumentalities B which are movable through the tubular element A in either a forward or backward direction, selectively. Such cleaning instrumentalities include a casing 10 which forms a hollow tank or receptacle 12 which defines an air dome or air bank for receiving compressed air and enables a building-up of an elevated pressure of air enclosed thereby. The air bank 12 has its proximal end 14 threadedly interconnected, as is indicated at 16, with an air hose 18, which is covered with closely spiraled steel wire 18', which air hose 18 supplies air under pressure from a suitable source of compressed air (not shown) into the interior of air bank 12, thus building up a suitable pressure of air therein.

The air bank 12 also has extending through it a conduit 20, the proximal end of which is connected as is indicated by connector 21 with a tubular conduit 22, which supplies a suitable liquid coating composition for application by the apparatus of this invention to the interior of tubular element A being cleaned. Such coating composition will be referred to in greater detail hereinafter, and is applied to tubular element A to inhibit accretions of dense adherent scale on the interior of the said tubular element, and also to minimize corrosion of the element A.

The conduit 20 is welded, as is indicated at 24, to the distal or forward end 26 of the air bank 12, the projecting end of the conduit 20 adjacent to this weld 24 being threadedly interconnected, as is indicated at 28, with a tubular branch arm 30 of a tubular valved elbow coupling 32. This branch arm 30 encloses a tubular passage 33, which registers with the conduit 20. The elbow coupling element 32 has a lower branch arm 34 which extends oppositely with respect to upper branch arm 30 and which is connected threadedly with a nozzle tube 38 which carries a mixing nozzle assembly 40 which will be described in greater detail hereinafter.

This nozzle assembly 40 includes a sleeve 42 which is threadedly mounted, as shown at 39, on the nozzle tube 38. This latter is provided with longitudinally extending tubular passage 44 which registers with passage 46 in the lower branch arm 34 of the coupling element 32. The aforementioned nozzle tube 38 terminates in an outwardly flaring or generally conical nozzle end section 48, which defines an end closure for the tubular passage 44 in the nozzle tube 38.

The sleeve element 42 defines an elongated annular chamber or slot 50 between itself and the nozzle tube 38, this slot 50 being concentric with respect to the tube 38 and has an end section 52 concentrically enclosing the expanding closure section 48 of the nozzle tube 38, this closure section 48 having an annular slot 54 opening into the end section 52 of chamber 50 at right angles to the said end section 52, the slot 54 thereby defining a second annular slot chamber disposed in a direction normal with respect to the said end section 52 of chamber 50 and receiving material from tubular passage 44 through ports 56 which connect this passage with the bottom of the said second annular chamber 54.

The aforesaid sleeve 42, which as has been stated above is mounted threadedly at 39 on the nozzle tube 38, is secured in place by a lock nut 58, a similar lock nut 60 securing the nozzle tube 38 in place in the lower branch arm 34 of the coupling element 32.

This coupling element 32 includes a continuous passage 62 for liquid coating material, which passage is controlled by a reciprocatory packless valve including a valve head 64 and an elongated valve stem or rod 66. The valve head 64 operates in a chamber 68 which is closed by a threadedly mounted cap 70, the under surface of which is recessed suitably to receive a compressed coil spring 72, which bears against the valve head 64 and normally maintains the valve head 64 seated on valve seat 74 at the adjacent end of the tubular passage 62.

The valve rod 66 terminates in a recessed terminal plate 76 which rests upon the upper side of a resilient flexible sealing diaphragm 78, mounted in a chamber 80, which diaphragm 78 divides the chamber 80 into an upper compartment 82 and a lower compartment 84, the valve stem rod 66 and its terminal plate 76 extending into the upper compartment 82 of chamber 80 and resting on the upper surface of diaphragm 78, as aforesaid.

The diaphragm 78 is mounted so as to seal against possibility of leakage of liquid from the upper compartment or section 82 of the chamber 80 into the lower compartment or section 84 of the said chamber, there being mounted in the latter section 84 a reciprocatory valve-actuating piston having a flanged head 86 from which extends a piston stem rod or push rod 88, this latter projecting through bottom closure wall 90 which closes the lower compartment or section 84, but which is apertured for passage of push rod 88. Also in this section 84 there preferably is mounted a compression coil spring 92 which encloses the push rod 88 and which is compressed between the bottom 90 of section 84 and the flange of the piston head 86, the spring 92 maintaining the piston head 86 against the underside of the diaphragm 78 in alignment with respect to the valve stem rod 66, the spring 92 being, however, of a substantially lighter gage than is the oppositely acting coil spring 72 which presses against the valve head 64 and maintains this valve head 64 normally seated against its adjacent seat 74 to close passage 62 for preventing flow of liquid coating composition through conduit 20 and tubular passage 62. Operation of this valve will be described in greater detail hereinafter.

The air bank or compressed air supply tank 12 has its forward or distal end 26 connected by compresesd air tubes 94 with the chamber 50 of the nozzle assembly, the compressed air tubes 94 entering the chamber 50 at substantially diametrically oppositely located ports 96, each of the tubes 94 being externally threaded for receiving a connector 98 and a lock nut 100 which secure the tubes 94 firmly in position in the forward end 26 of the tank 12. In addition to the compressed air tubes 94, the compressed air tank 12 has mounted through the forward end wall 26 a plurality of nozzles 102, which are provided for the purpose of preventing spray from backing up and contaminating the equipment, there being provided, however, in the proximate or rear end wall 14 of the tank 12, a valved condensate drain 105 for enabling drainage from the tank of any liquid collecting in the tank.

Application of protective liquid coating material to the interior of tubular element A being cleaned and protected against accretions of dense scale is controlled by actuation of the control valve in the elbow connector 32. For controlling actuation of this valve, lower chamber casing 104 has secured thereto, in any suitable manner, an annular collar 106 from which depend a pair of complemental bracket arms 108, through which extend a pin 110 on which a valve actuating cam linkage 112 is mounted rotatably. As the apparatus of the instant invention is pushed forwardly through the tubular element A in the direction indicated by the arrow 114 in FIG. 1, the cam linkage 112 is maintained by its engagement with the surface of tubular element A in the retracted position shown in FIG. 1 so that the cam linkage 112 is maintained in retracted position remote from rod 88, so that spring 72 is enabled to maintain valve head 64 seated on its adjacent seat 74 for blocking passage of coating material from its supply pipe 20 into tube 44, so that only air is supplied by the nozzle assembly against the interior of the tubular element A so that loose accretions may be blown out of the tubular element A in advance of the progression of the apparatus through this tubular element. This action continues throughout the course of the forward movement of the apparatus through the tubular element.

This tubular element A has opposite open ends, not shown, the apparatus of the instant invention being introduced into the proximate, or entry, end of the tubular element, and is pushed through the tubular element in a forward movement until it emerges from the distal, or exit, end of the tubular element. It will be noted from FIG. 4, for example, that a coil spring 116 encloses the pin 110 and acts on the cam linkage 112 so as to quickly snap the latter into a straight or neutral position when clearance between the cam linkage 112 and the exit end of the tubular element A is effected. Reverse actuation of the apparatus backwardly into the tubular element A causes the cam 112 to be rotated against the pressure of the spring 116 and to be shifted into reverse position, as is shown in FIG. 3, so that the cam linkage 112 engages the bottom end of piston push rod 88, and as the apparatus is retracted into the tubular element A, the pressure engagement between the latter and the cam linkage 112 causes this cam linkage to rotate into reverse position against the push rod 88 for lifting the push rod 88 and its piston head 86 against central portions of diaphragm 78, for causing upward distortion of the diaphragm, as is indicated by FIG. 3 of the drawings, thereby consequently raising plate 76 and valve rod 66 until valve head 64 is lifted from its seat 74 against pressure of spring 72 and placing liquid supply pipe 20 and liquid passage 44 into communication by way of passage 62 in the elbow connector 32, so that the liquid coating composition is supplied to the nozzle assembly throughout duration of withdrawal of the apparatus through the tubular element A, as is indicated by direction of arrow 118 in FIG. 3, while at the same time air is being supplied from compressed air tank 12 into chamber 50 through the pipes 94.

This chamber 50 of the nozzle assembly is actually an annular slot enclosing forward end portions of the nozzle tube 38, including the outwardly diverging end section or portion 48 of the nozzle tube 38, in which section there is provided the annular slot defining chamber 54 that extends around the end section 48 and is supplied with liquid coating composition from tubular passage 44 through ports 56. The air which is being introduced into the slot chamber 50 is accelerated in its velocity as it passes through this chamber by the restricted space thereof, and as such air flows outwardly across the annular chamber 54, it creates a vacuum in the latter chamber that facilitates flow of liquid coating composition from the chamber 54 and enhances materially the commingling thereof with the air in chamber 50, the resulting mixture of coating composition and air being discharged from the nozzle assembly as a finely divided spray or mist, and it is applied in such form to the interior of the tubular element A during the entire period of withdrawal of the apparatus from the tubular element. When the apparatus has been withdrawn sufficiently from the tube so as to cause the cam linkage 112 to clear the entry end of the tubular element, the spring 116 snaps the cam linkage back into neutral position to allow the piston rod 88 to drop and to cause the spring 72 to seal the valve head 64 on its seat 74 for preventing further flow of liquid coating composition into the tubular element A.

In order to facilitate insertion and withdrawal movements of the apparatus through the tubular element A, and to maintain the apparatus in concentric relation with respect to the tubular element while enabling the apparatus to be used for cleaning and protectively coating such tubular elements throughout comparatively wide ranges of variable diameters, the structural features of the instant construction include the provision of a plurality of substantially equally spaced, resiliently mounted elongated guide runners 120, each of which is bent or curved inwardly as is indicated at 122, so as to enable the opposite ends of the runner to clear readily the respective open ends of the tubular element A for unobstructed guidance of the equipment into and out of the tubular element responsively to reciprocatory directional movements of the equipment through the tubular element as well as to guide each of the runners over any scale or other impediments that may be encountered, or any deflected portion of the tubular element, or any deformity in the tubular element which may be existent, the provision of such guide runners, which engage the inner surface or surfaces of the tubular element A, assuring a smooth operation of the equipment. Each runner 120 is pivotally connected by a pin 124 to similar piston rods 126, so that each runner has a two-point mounting, the mountings being located at substantially equal distances from the opposite ends of the respective runners. Each piston rod 126 terminates in a piston head 128 positioned in a housing 130 that projects into the air tank 12 as integral parts of the casing 10 thereof. A component coil spring 132 between piston heads 128 and the closed end 134 of each housing continuously urges the respective runners 120 into pressing engagement with the interior of tubular element A while permitting, in conjunction with pivot pin 124, the self-adaptation or self-adjustment of each runner to any surface irregularities or shape deformities which may be existent in the tubular element being cleaned. For rendering the present equipment adaptable to cleaning tubular elements of varying diameters, each piston rod 126 slides through a plug 136 each of which is threadedly mounted, as is indicated at 138, in its respective housing 130 such plugs serving as runner stops, and the threaded mounting thereof in the respective housing 130 enabling adjustment of the radius of the respective runners with respect to the casing 10 of air tank 12, it being desirable in practice, that the apparatus of this invention have its longitudinal axis coincident with that of the tubular element being cleaned and protectively coated for assuring uniformity in the cleaning and coating actions of the apparatus on all areas of the interior surface or surfaces of the tubular element being treated.

It is thought that the operation of the equipment of the instant invention will be evident from the foregoing descripion when taken in conjunction with the accompanying drawings. However, the following condensed summary thereof may be offered:

With particular reference to FIG. 1 of the drawings, air hose 18, which is covered with closely spiraled steel spring wire 18', supplies compressed air from a source thereof, not shown, into the air tank or receptacle 12. Air tubes or pipes 94 convey air from tank 12 to nozzle assembly 40, which operates as a dual purpose nozzle assembly, it supplying air to the interior of tubular element A, which may be a boiler tube by way of example, such air ejecting loose detritus from the tube A in advance of the apparatus as the latter is progressed through the tube A by manipulation of hoses 18 and 22. The vacuum-creating nozzle assembly 40 draws liquid protective coating from a source thereof and causes it to travel through hose 22, pipe 20, automatic valve assembly, nozzle tube 44, and then to become mixed with air within the nozzle assembly 40. A combination of atomized protective coating and air is ejected from the nozzle assembly 40 in the form of an annular spray. Drain valve 105 is provided for the purpose of draining condensate or oil from the air reservoir tank 12, and purge nozzles 102 are provided for the purpose of preventing spray from backing up and contaminating the spraying apparatus with protective coating.

From FIG. 2 of the accompanying drawings, compresed air conveyed by air tubes 94, enters annular slot chamber 50, producing an increased velocity of air. Annular slot chamber 54 is related to the slot chamber 50 by 90 degrees. Increased velocity air in annular slot chamber 50, passing over annular slot chamber 54 causes a vacuum in the latter which in turn causes liquid protective coating to flow through chamber 62 and through the nozzle tube 44 from the automatic packless liquid valve in the elbow connector 32.

Again with reference to FIGS. 1 and 3, when the instant apparatus is projected through tubular member A, for example, a boiler tube, automatic cam linkage 112, held in a neutral position by spring 116, is forced back and drags against the inside of tubular member A, as is shown in FIG. 1, allowing only air to exit from the nozzle assembly 40. The spraying apparatus is projected through and out of tubular element A until the automatic cam linkage 112 is clear of tube A, which causes the cam linkage 112 to snap into neutral position by the spring 116. The apparatus then is withdrawn through tube A, which causes cam linkage 112 to be forced by tube A upon push rod 88, as is shown by FIG. 3, which in turn exerts a force upon diaphragm 78 and plate 76, thereby lifting valve head 64 from its seat 74 and allows liquid protective coating to flow from pipe 20 to the nozzle assembly 40.

Also from FIGS. 1, 2, 3 and 5, it will be seen that each guide runner 120 is pivoted to its piston arm 126 by means of a pivot pin 122. The radius of each runner 120 with respect to the air reservoir 12 is determined by adjustable runner stop 136. Under normal conditions, such as where the guide means 120 are traveling through a round tube A, each of the runners 120 is kept at its greatest radius by its spring 132, while under abnormal conditions, such as the guide means encountering scale or an obstruction within tubular element A, or deflected portion of the tube, a corresponding guide runner 120 will retract, due to scale obstruction, or out of round tube exerting a force on such runner 120, which, in turn exerts a force on piston arm 126, and causes spring 132 to compress.

FIG. 3 illustrates the entire spraying apparatus of the instant invention in operation and confined within tubular element A and being withdrawn by means of air supply hose 18 and liquid supply hose 22. The automatic cam linkage is in a position for exerting a force upon piston push rod 88 to lift valve head 64 from its seat 74, allowing liquid protective coating composition to be admitted into nozzle 44, thence through ports 56 and annular passage 54 and directed against the interior of tube A. At the same time, an anuular spray of air exiting from purge nozzles 102 prevents atomized spray exiting from the nozzle from contaminating the spraying apparatus.

In FIG. 1 there is illustrated the entire spraying apparatus of the invention confined within and being projected through tubular element A by means of air supply hose 18 and liquid supply hose 22. In FIG. 1, the tube A is cleaned by air pressure exiting from nozzle assembly 40 and purge nozzles 102. It will be noted that the automatic cam linkage 112 is in reverse position with respect to the showing of FIG. 3 and valve head 64 is closed on its seat 74. In this view (FIG. 1), the apparatus is being advanced through and out of tube A, to a point when the cam linkage 112 is clear of the tube A, when the cam linkage 112 is snapped into its neutral position by spring 116. The apparatus then is withdrawn through tube A as has been explained above in connection with FIG. 3.

FIG. 4 is a front view of the equipment, illustrating the position of the purge nozzles 102 and cam linkage spring 116. There also are illustrated in the view the guide runners 120, nozzle element 48, elbow connector 32 and piston push rod 88. The nozzle element 48 is provided with a forwardly extending operating tip 140 for reception of a suitable tool for dismantling and reassembling the nozzle assembly whenever desired. Also, nozzle element 48 is provided with a peripheral flange 142, having an underside deflecting surface 144 for producing an annular discharge from the nozzle, which discharge is deflected by the surface 144 against the interior of the tube A.

The foregoing description and accompanying drawings are applicable to a typically representative embodiment of a scale-cleaning or removing and coating apparatus embodying the features of the present invention, although it will be understood that modifications of structural details may be made without departing from the concept of the herein described invention, and accordingly, it will be understood that it is intended and desired to embrace within the scope of the invention such modifications and changes as may be necessary or desirable to adapt the invention to varying conditions and uses, as defined by the appended claims.

I claim:

1. Apparatus for removing solid scale-forming materials from interiors of conduits and pipes such as boiler tubes having opposite open ends and being subject to scale-producing actions of hard water, the apparatus being adapted for coating such interiors with protective liquid coating compositions, which apparatus is adapted to be progressively advanced and retracted, selectively, through and out from such tubes and which comprises in combination, a chamber for maintaining a supply of air under pressure, means for introducing compressed air into the chamber, a nozzle assembly carried by the chamber, liquid-supplying conduit means extending through the chamber and nozzle assembly, a liquid-control valve in the conduit means for opening and closing the conduit means, selectively, air ducts interconnecting the chamber and nozzle assembly for discharging compressed air from the chamber through the nozzle assembly, valve-operating mechanism carried by said liquid supply conduit, said valve operating mechanism comprising a spring biased plunger in communication through a diaphragm with said liquid-control valve for operating the liquid-control valve, and pivotally mounted lever means mounted on said liquid supply conduit acting on said spring biased plunger of said valve operating mechanism for opening and closing the valve selectively responsively to advancement and retraction of the lever means beyond either end of the tube being cleaned and coated.

2. Apparatus as claimed in claim 1, further comprising a plurality of guide runners for the apparatus for maintaining the apparatus concentrically in the tube with respect to the tube, resilient mounting means for the runners, pivotal connections between the runners and mounting means, adjusting means for the runners for selectively varying radial limits to concentric movement of the runners away from and toward the compressed air chamber, and housings extending into the compressed air chamber for the mounting means for the runners, the housings enclosing the mounting means for the runners.

3. Apparatus as claimed in claim 2, wherein each mounting means for the runners includes a pair of pistons for each runner, each piston including a piston head and a piston rod extending outwardly from the piston head, said piston being slidably mounted within said cylindrical housing for each piston extending from the periphery of the compressed air chamber into the interior of the chamber, each of said housings including a closed end within the said compressed air chamber, a coil spring in the housing compressed between the closed end and the piston head, and said pivotal connection between each runner and its mounting means connecting said piston rods to said runner, each of the runners being resiliently and pivotally mounted with respect to the compressed air chamber for being self-accommodating to any irregularities in the tube being cleaned.

4. Apparatus as claimed in claim 3, wherein opposite end portions of each runner are bent inwardly with respect to the compressed air chamber for enabling each runner to ride over without obstruction thereto any irregularities existent within the tube.

5. Apparatus as claimed in claim 1, wherein the nozzle assembly includes a nozzle tube in communication with said liquid-supplying conduit which projects through the chamber, an expanding closure section integral with the nozzle tube and having an annular slot therein in communication with the nozzle tube through a plurality of ports connecting said nozzle tube and said annular slot, a complemental nozzle member mounted on the aforesaid nozzle member as a concentrically disposed sleeve therefor and defining therewith an intermediate restricted slot-like fluid discharge passage, the annular slot in the first-mentioned nozzle member opening into the restricted slot-like fluid-discharge passage at substantially right angles, the air ducts interconnecting the chamber and nozzle assembly opening into the restricted slot-like fluid outlet passage in advance of the opening between the said passage and the annular slot in the first-mentioned nozzle member.

6. Apparatus as claimed in claim 5, wherein the first-mentioned expanding closure section comprises a solid outwardly diverging closure portion closing the nozzle tube and having a peripheral flange extending beyond the restricted slot-like fluid-discharge passage and a sloping fluid-deflecting surface intermediate the flange and the restricted slot-like fluid-discharge passage for producing an annular fluid discharge directed essentially against the tubular surface being cleaned and coated by the apparatus.

7. Apparatus as claimed in claim 1, having an elbow connection intermediate the chamber and nozzle assembly forming a portion of said liquid supplying conduit means, the liquid control valve being a packless valve mounted in the elbow connection and having a valve head and a valve stem depending from the head, a portion of the elbow connection adjacent to the valve head defining a seat therefor to enable the valve head to close the liquid passage for preventing flow of liquid therethrough, compressed spring means operating against the valve head to maintain normally the valve head in closed position, a resilient deformable diaphragm mounted in the elbow connection and engaged on an upper side by the said valve stem and defining a seal interiorly dividing the elbow connection into an upper compartment and a lower compartment, the liquid control valve being in the upper compartment, the valve-operating mechanism including a reciprocatory piston having a head and a push rod in the lower compartment, the head of the piston bearing against the diaphragm underside thereof, the push rod of the piston projecting from the lower compartment through a bottom closure therefor, said pivotably mounted lever means rotatably mounted on the elbow connector adjacent to the push rod and adapted to actuate the push rod for upwardly deforming the diaphragm for raising the control valve head and valve stem in opposition to the action of the said spring means on the valve head of the control valve for unseating the control valve responsively to movement of the apparatus in one direction through a conduit being cleaned to open the liquid passage, said pivotally mounted lever means being rotatable away from engagement with the push rod responsively to movement of the apparatus in an opposite direction through the conduit, the piston in the lower compartment moving away from the diaphragm which resumes undeformed condition, and mounting means for said pivotally mounted lever means carried by the elbow connection and including a tensioned quick-acting spring operating on pivotably mounted lever means for quickly moving said pivotably mounted lever means into a neutral position responsively to emergence of said pivotably mounted lever means from the conduit, said pivotably mounted lever means being maintained in selected position relative to the push rod by its engagement with the conduit.

8. Apparatus as claimed in claim 1, further comprising a plurality of nozzles substantially circularly mounted on the air chamber around a portion of the conduit means, the nozzles communicating with the interior of the chamber for delivering air jets from the chamber in an annular discharge pattern against interior surfaces of the conduit being cleaned.

References Cited in the file of this patent

UNITED STATES PATENTS

| 1,147,237 | Hauer | July 20, 1915 |
| 1,717,986 | Liebau | June 18, 1929 |
| 1,850,481 | Telfer | Mar. 22, 1932 |
| 2,369,720 | Crane | Feb. 20, 1945 |
| 2,428,292 | Queen | Sept. 30, 1947 |
| 2,431,658 | Demb et al. | Nov. 25, 1947 |

OTHER REFERENCES

| 400,363 | Great Britain | Oct. 26, 1933 |